United States Patent [19]
Ernst

[11] Patent Number: 5,848,758
[45] Date of Patent: Dec. 15, 1998

[54] SAFETY BELT REELING DEVICE WITH TWO VEHICLE-SENSITIVE SENSORS WITH DIFFERENT THRESHOLD VALUES

[75] Inventor: Hans-Helmut Ernst, Ahrensburg, Germany

[73] Assignee: Autoliv Development AB, Vargarda, Sweden

[21] Appl. No.: 708,185

[22] Filed: Sep. 6, 1996

[30] Foreign Application Priority Data

Sep. 6, 1995 [DE] Germany .................. 195 32 781.0

[51] Int. Cl.$^6$ .................................................. B60R 22/40
[52] U.S. Cl. .................................. 242/384.4; 242/384.6; 280/806; 297/478
[58] Field of Search ............... 280/806; 242/384, 242/384.4, 384.5, 384.6; 297/476, 477, 478, 479, 480

[56] References Cited

U.S. PATENT DOCUMENTS

| | | | |
|---|---|---|---|
| 3,237,729 | 3/1966 | Proctor | 297/480 |
| 4,135,410 | 1/1979 | Filderman | 242/384.5 |
| 4,209,186 | 6/1980 | Close | 280/806 |
| 4,280,584 | 7/1981 | Makishima | 242/384 |
| 4,998,684 | 3/1991 | Mori | 242/384.6 |
| 5,622,383 | 4/1997 | Kielwein et al. | 280/806 |

FOREIGN PATENT DOCUMENTS

| | | | |
|---|---|---|---|
| 766618 | 9/1967 | Canada | 297/478 |
| 7630002 | 9/1976 | Germany . | |
| 3824164 | 1/1990 | Germany . | |

*Primary Examiner*—Harold J. Tudor
*Attorney, Agent, or Firm*—Robert W. Becker & Associates

[57] ABSTRACT

A safety belt reeling device with a belt-sensitive control system, for locking the reeling shaft when safety belt removal occurs at a rate above a preset limit, has a reeling shaft and a safety belt fastened thereto. The reeling shaft is rotatable for winding and unwinding the safety belt. A vehicle-sensitive control system locks the reeling shaft when horizontally acting vehicle acceleration forces are too great. The vehicle-sensitive control system has a control disk with outer toothing and a locking lever cooperating with the outer toothing. The reeling shaft is locked when the locking lever engages the outer toothing and released when the locking lever disengages the outer toothing. The vehicle-sensitive control system has a first sensor activating the locking lever for engaging the outer toothing when a first preset threshold value, defined by government standards, for horizontally acting vehicle acceleration forces is surpassed. The vehicle-sensitive control system has a second mechanical sensor acting directly on the locking lever. It activates the locking lever for engaging the outer toothing when a second preset threshold value for the horizontally acting vehicle acceleration forces is surpassed. The second threshold value is greater than the first threshold value and represents a force magnitude equivalent to low impact accidents.

5 Claims, 4 Drawing Sheets

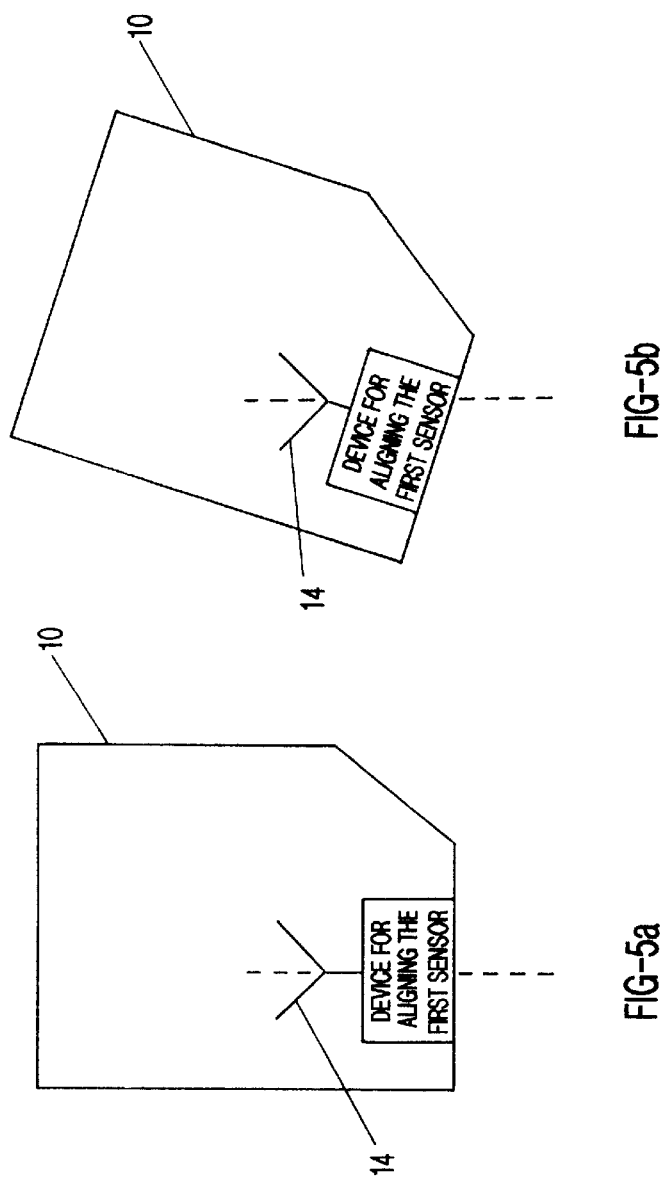

SAFETY BELT REELING DEVICE WITH TWO VEHICLE-SENSITIVE SENSORS WITH DIFFERENT THRESHOLD VALUES

Background of the Invention

The present invention relates to a safety belt reeling device with a belt-sensitive control system for locking the reeling shaft of the safety belt reeling device when safety belt removal occurs at a rate above a preset limit. The device has also a vehicle-sensitive control system for locking the reeling shaft when horizontal vehicle accelerations occur, whereby the vehicle-sensitive control system comprises a vehicle-sensitive sensor and a control disk with a toothing and wherein the vehicle-sensitive sensor upon surpassing a threshold value, preset according to government standards, moves a locking lever into the toothing of the control disk.

A safety belt reeling device with the aforementioned features is known, for example, from German Offenlegungsschrift 38 24 164. The vehicle-sensitive sensor in this device is in the form of a ball sensor having a ball acting when deflected onto an impulse lever which moves the locking lever into the outer toothing of the control disk which is part of the control system and by blocking the rotation of the control disk causes locking of the reeling shaft. For determining the threshold value of the only vehicle-sensitive sensor, government standards provide the following values: 0.45 g for European countries and 0.7 g for the United States of America.

The known safety belt reeling device has the disadvantage that when used under certain conditions, for example, when mounted with its vehicle-sensitive sensor within components that are incline-adjustable, as, for example, the back rest of a vehicle seat, or when used with an electric control system for the locking lever, in conjunction with a sensor positioned external to the safety belt reeling device, complete safety is not fully guaranteed, even though the user desires a high security level.

It is therefore an object of the present invention to improve in a safety belt reeling device with the aforementioned features the safety level with respect to the control (activation) of the locking system by the vehicle-sensitive control system.

SUMMARY OF THE INVENTION

The vehicle safety belt reeling device with a belt-sensitive control system for locking a reeling shaft of the safety belt reeling device when safety belt removal occurs at a rate above a preset limit, according to the present invention is primarily characterized by:

A reeling shaft;

A safety belt fastened with one end to the reeling shaft;

The reeling shaft rotatable for winding and unwinding the safety belt;

A vehicle-sensitive control system for locking the reeling shaft when horizontally acting vehicle acceleration forces are too great;

The vehicle-sensitive control system comprising a control disk with an outer toothing and a locking lever for cooperating with the outer toothing such that the reeling shaft is locked when the locking lever engages the outer toothing and the reeling shaft is released when the locking lever disengages the outer toothing;

The vehicle-sensitive control system further comprising a first sensor, the first sensor activating the locking lever for engaging the outer toothing when a first preset threshold value, defined by government standards, for the horizontally acting vehicle acceleration forces is surpassed;

The vehicle-sensitive control system further comprising a second mechanical sensor acting directly on the locking lever, the second mechanical sensor activating the locking lever for engaging the outer toothing when a second preset threshold value for the horizontally acting vehicle acceleration forces is surpassed, the second threshold value being greater than the first threshold value and representing a force magnitude equivalent to low impact accidents.

Preferably, the vehicle safety belt reeling device is mounted on an incline-adjustable vehicle seat such that, when the vehicle seat is incline-adjusted, the incline of the vehicle safety belt reeling device is changed. The vehicle safety belt reeling device further comprises a device for automatically vertically aligning the axis of the first sensor when the vehicle seat is incline-adjusted. The second threshold value changes upon changing of the incline of the vehicle safety belt reeling device, but in any position of the vehicle safety belt reeling device the second threshold value is greater than the first threshold value.

Advantageously, the vehicle-sensitive control system comprises a solenoid, wherein the solenoid is excited by the first sensor, when the first threshold value is surpassed, and moves the locking lever into engagement with the outer toothing.

Preferably, the second mechanical sensor is a ball sensor comprising a socket, a ball positioned in the socket, and an impulse lever activated by the ball and acting on the locking lever when activated, the socket comprised of slanted surfaces having an angle of incline relative to the vertical.

Preferably, the angle of incline of the slanted surfaces defines the second threshold value.

The invention is based on the principle that the locking lever has coordinated therewith a second mechanically operating vehicle-sensitive sensor that directly acts on the locking lever, wherein the threshold value of the second mechanical sensor is greater than the first threshold value of the first vehicle-sensitive sensor and is activated upon acceleration forces occurring at low-impact accidents. The second mechanically operating vehicle-sensitive sensor which improves the safety level of the safety belt reeling device thus does not provide a redundant sensor of the vehicle-sensitive control system and is thus not simply a protection against failure of the first vehicle-sensitive sensor, but due to the threshold value being greater than the legally defined first threshold value (government standard) of the first vehicle-sensitive sensor the second vehicle-sensitive sensor does not act below the legally defined threshold value, i.e., during normal driving operation of the vehicle. The second additionally provided vehicle-sensitive sensor thus functions only under certain load conditions and mounting conditions.

A first advantageous embodiment of the inventive concept is realized, when the vehicle safety belt reeling device with integrated first vehicle-sensitive sensor is mounted in a portion of the vehicle seat that is adjustable with respect to its incline, i.e., mounted within the adjustable seat portion or adjustable back rest of the vehicle seat, or mounted within a vehicle seat that can be adjusted in its entirety relative to the horizontal with respect to its incline. Since in such situations the threshold value of the first vehicle-sensitive sensor would be changed and the legally defined limits (thresholds) would no longer be fulfilled, a device for aligning the first vehicle-sensitive sensor is already disclosed in the device of German Offenlegungsschrfit 38 24

164 so that even after a change of the inclined, position of the seat or seat portion and thus the safety belt reeling device, the vehicle-sensitive sensor is always aligned with the axis of the earth (the vertical) so that its threshold value corresponding to the legally defined values is always ensured in any functional position of the safety belt reeling device. However, when the alignment of the first vehicle-sensitive sensor is faulty, the person buckled in with the safety belt reeling device is at risk to be injured. In this situation the inventive arrangement of the second vehicle-sensitive sensor advantageously takes over. The second vehicle-sensitive sensor is fixedly arranged within the safety belt reeling device such that in any inclined position of the safety belt reeling device the threshold value of the second vehicle-sensitive sensor is greater than the threshold value of the first vehicle-sensitive sensor and changes for any adjustment of the angle of incline. Thus, it is ensured in any given situation that, even when the first vehicle-sensitive sensor is no longer operative, a locking of the reeling shaft is ensured because the second vehicle-sensitive sensor is activated upon surpassing the corresponding acceleration forces of the second threshold value even though this threshold value, depending on the mounting position, is to a greater or lesser extent above the legally defined limit, i.e., is variable. Since the second vehicle-sensitive sensor is fixedly mounted within the safety belt reeling device and a change of its threshold value as a function of the slanted position of the safety belt reeling device is accepted, a functional failure of the second vehicle-sensitive sensor is not to be expected.

In a second embodiment for realizing the inventive concept, the locking lever is moved into its locking position when activated by an excited solenoid. In this embodiment the locking system of the reeling shaft is in the form of an electrically operating system in the form of a so-called active embodiment (in contrast to a so-called passive embodiment). In a passive embodiment the solenoid, under normal driving conditions of the vehicle, is permanently excited in order to maintain the locking lever out of engagement with the toothing of the control disk. This results in a corresponding electric current consumption. Furthermore, even when the ignition is shut off, it must be ensured that the locking lever is out of engagement with the toothing of the control disk so that, even for the ignition being turned off and the solenoid not being excited, a use of the safety belt reeling device must be possible. In contrast, in the present invention the active embodiment means that, under normal driving conditions of the vehicle, the locking lever, without excitation of the solenoid, is constantly out of engagement with the toothing of the control disk and that only after supply of electric energy to the solenoid in the situation of an accident, i.e., in the case of activation, the solenoid controls actively the locking lever so as to be brought into engagement with the toothing of the control disk. Accordingly, in this active embodiment an interruption of the electric supply of the solenoid would result in an immediate failure of the locking system of the safety belt reeling device. For the use of the electrically activated control system the present invention provides a solution to this problem by providing inventively a combination of the fixedly mounted second vehicle-sensitive sensor with the electrically activated control system. Even for a possible failure in regard to the excitation of the solenoid, the second vehicle-sensitive sensor in the case of an accident will ensure locking of the reeling shaft in any scenario.

According to another embodiment of the present invention, the second vehicle-sensitive sensor is a ball sensor comprising a socket with a ball arranged therein and an impulse lever which upon deflection of the ball is activated and actuates the locking lever into engagement whereby the socket is comprised of slanted surfaces arranged at an angle of incline relative to the vertical. These slanted surfaces define with their angle of incline the threshold value of the ball sensor. However, the invention is not limited to a ball sensor as a second vehicle-sensitive sensor; instead, the use of any mechanically operating sensor is possible in this context.

BRIEF DESCRIPTION OF THE DRAWINGS

The object and advantages of the present invention will appear more clearly from the following specification in conjunction with the accompanying drawings, in which:

FIGS. 5a–5c show schematically the reeling device in an upright position and positions inclined to the left and the right, showing the first sensor being automatically vertically aligned (dashed line indicating the vertical alignment).

DESCRIPTION OF PREFERRED EMBODIMENTS

The present invention will now be described in detail with the aid of a specific embodiment utilizing FIGS. 1 through 3a to 3c.

Figure 1:
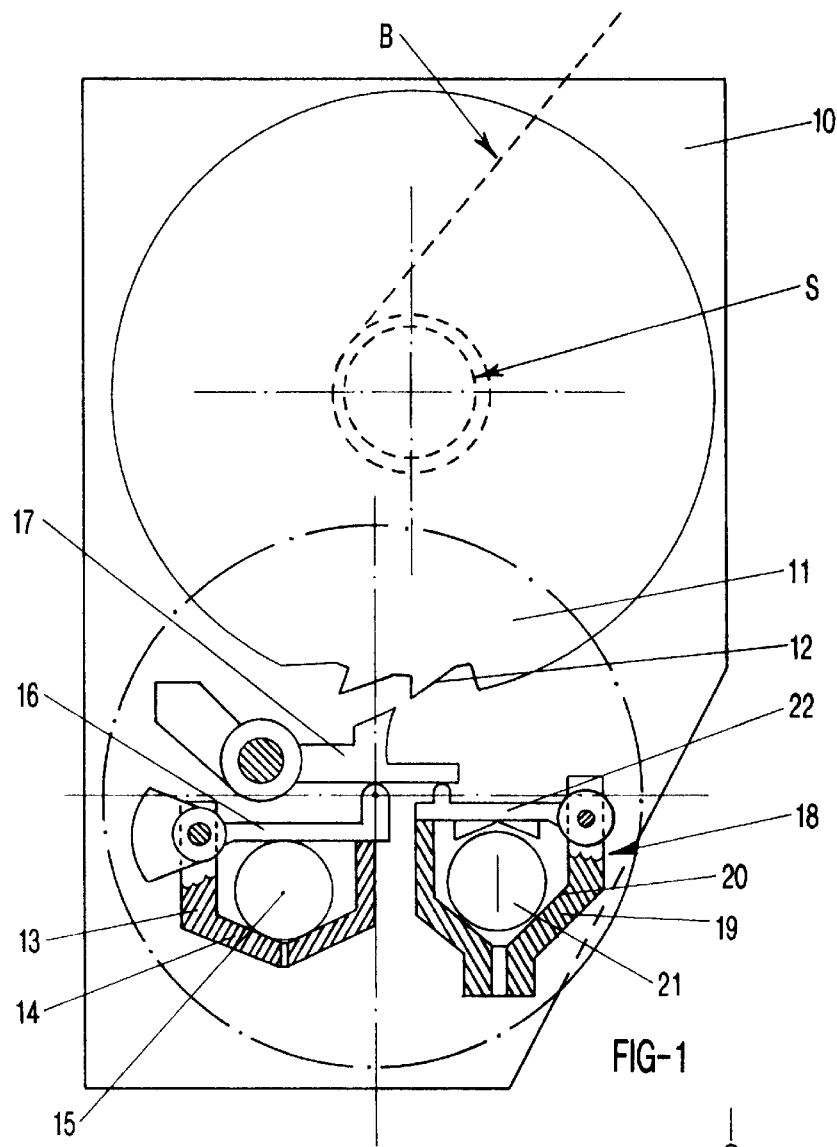
FIG. 1 shows a safety belt reeling device with a control system comprising two mechanically operating vehicle-sensitive sensors in a schematic representation.

FIG. 1 shows a first embodiment in which the safety belt reeling device comprises a housing 10 and a reeling shaft S mounted therein so as to be rotatable and having connected thereto the safety belt B. The locking system, which is not represented in detail, comprises as one component a control disk 11 with an outer toothing 12 for locking the reeling shaft. The control and locking system is designed such that by locking the control disk 11 in a manner known per se the locking of the reeling shaft is realized. The mounting of the reeling shaft S and various embodiments for cooperation with the locking disk are well known in the art and are therefore not discussed in detail.

A first vehicle-sensitive sensor 13 is part of the vehicle-sensitive control system and in the shown embodiment is in the form of a ball sensor with a socket 14 and a ball 15 arranged therein. When acceleration forces occur, a displacement of the ball 15 within the socket 14 results in an activation of the impulse lever 16 which acts on the locking lever 17 to bring it into engagement, upon pivoting, with the outer toothing 12 of the control disk 11. Thus, for respectively occurring acceleration forces the reeling shaft is locked.

In addition to the first vehicle-sensitive sensor 13 a second vehicle-sensitive sensor 18 is provided which is also embodied as a ball sensor with a ball 21 arranged in a socket 19. It further comprises an impulse lever 22 which, upon activation, also acts on the locking lever 17. The socket 19 of the second vehicle-sensitive sensor 18 is comprised of slanted surfaces 20 which are arranged at an angle of incline to the vertical whereby their angle of incline determines the threshold value of the ball sensor. This will be explained in detail in connection with FIGS. 3a to 3c.

Figure 2:
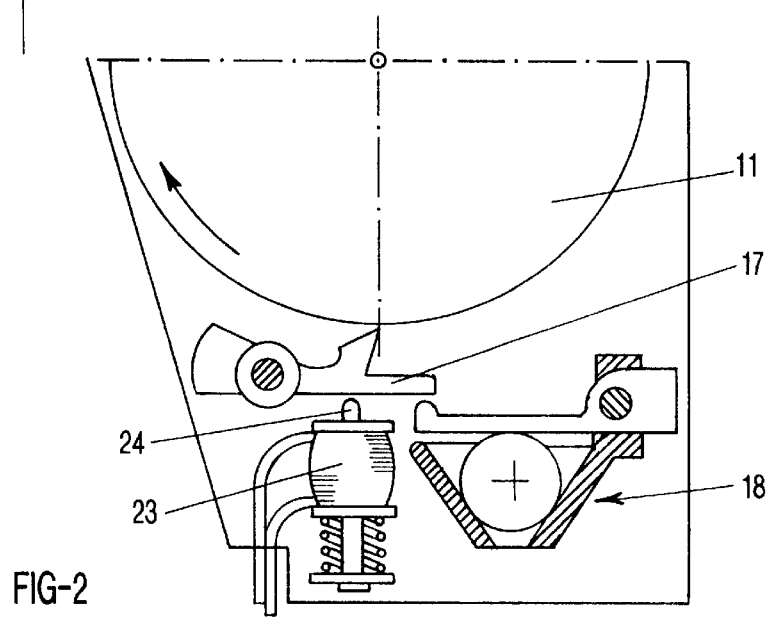
FIG. 2 shows a safety belt reeling device with an electrically operating vehicle-sensitive control system and a second mechanically operating vehicle-sensitive sensor in a schematic representation.

FIG. 2 shows the cooperation of the second vehicle-sensitive sensor 18 with an electrically operated control system which is comprised of a push rod 24 longitudinally displaceably arranged so as to act on the locking lever 17. In the case of activation the push rod 24 is displaced by a solenoid 23 and pushed the locking lever 17 into engagement with the outer toothing (not represented in FIG. 2) of the control disk 11. The electrically operating control system is a so-called active control system in which the push rod 24 during normal operation of the vehicle, respectively, of the safety belt reeling device is constantly out of engagement with the outer toothing of the control disk 11 so that no unnecessary electric consumption takes place. Only when a non-represented first vehicle-sensitive sensor determines the occurrence of respective acceleration forces, the sensor being positioned external to the safety belt reeling device, the solenoid 23 is activated by supplying electricity thereto and thus causes the displacement of the push rod 24 into engagement with the outer toothing of the control disk 11. In this embodiment a second vehicle-sensitive senor 18 is also provided whereby its impulse lever 22 acts directly onto the locking lever 17 and, in case that the electric supply of the solenoid 23 fails, causes a movement of the locking lever 17 into the outer toothing of the control disk 11 when surpassing its threshold value.

Figure 3A:
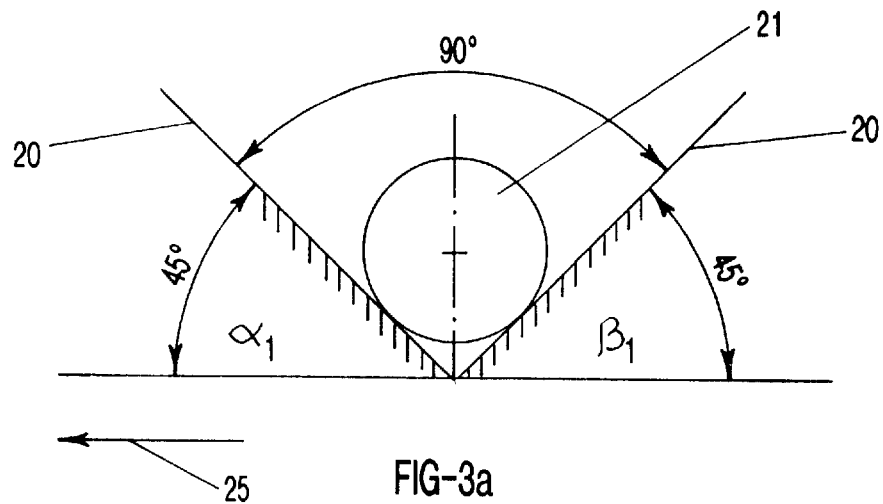
FIGS. 3a to 3c show in schematic representation the second mechanically operating vehicle-sensitive sensor in different mounted positions of the safety belt reeling device resulting in various slanted positions relative to the vertical.
Figure 3B:
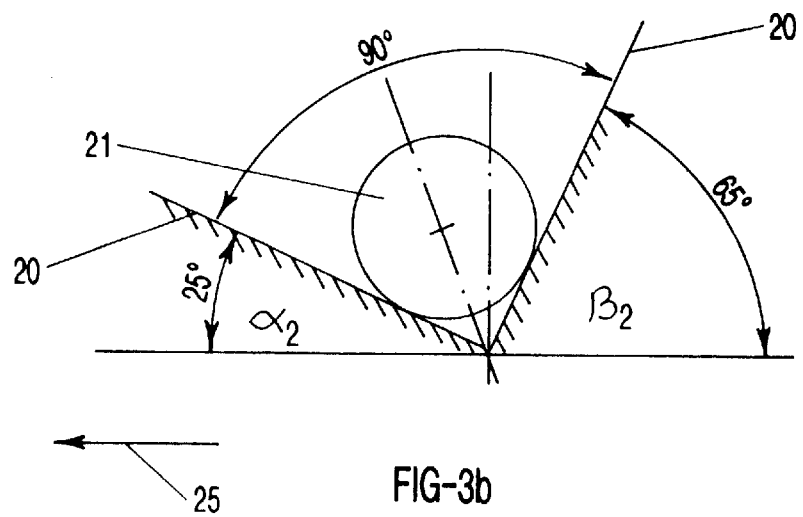
Figure 3C:
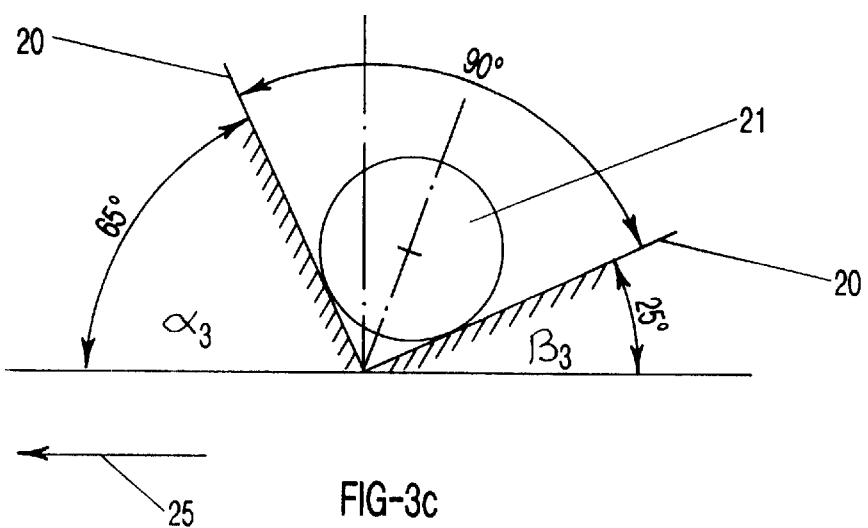
Figure 4:
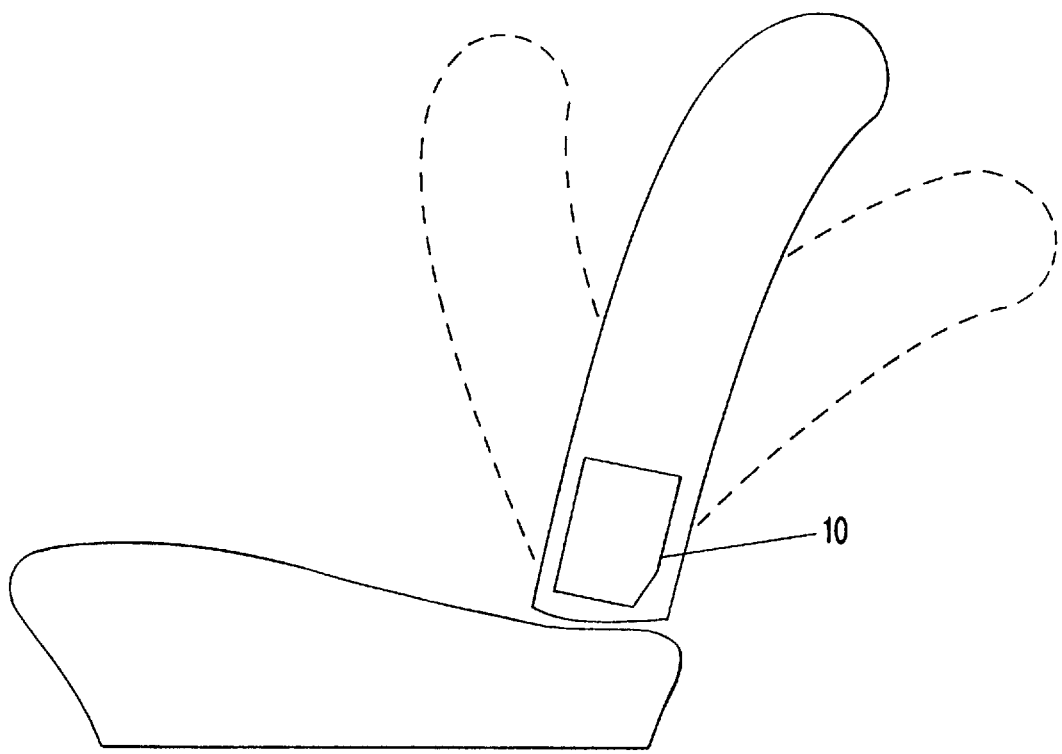
FIG. 4 shows a vehicle seat with inventive reeling device (represented schematically by the housing) attached to the back rest, indicating in dashed lines adjusted positions of the backrest.

The second vehicle-sensitive sensor 18 is fixedly connected to the safety belt reeling device so that, for example, a mounting of the safety belt reeling device at different slant angles relative to the vertical also results in a change of the threshold value of the second vehicle-sensitive sensor 18. For this reason, the threshold value is determined such that in any slanted position of the safety belt reeling device the threshold value of the second vehicle-sensitive sensor is greater than the threshold value of the first vehicle-sensitive sensor. Accordingly, the second vehicle-sensitive sensor 18 only becomes operative upon failure of the first vehicle-sensitive sensor 13, respectively, of the vehicle-sensitive control system (solenoid 23). In FIGS. 3a to 3c such different mounting positions of the safety belt reeling device are shown in the form of schematic representations of the resulting conditions of the second vehicle-sensitive sensor 18. The respective mounting positions are indicated by the angular positions of the slanted surfaces 20 of the vehicle-sensitive sensor 18 with the ball 21 contained thereby.

In FIG. 3a the neutral position of the safety belt reeling device with corresponding second vehicle-sensitive sensor 18 is represented which shows the mounting position of the safety belt reeling device at a back rest of a vehicle seat. The back rest is slanted at an angle of about 20° relative to the vertical in the rearward direction, i.e., counter to the travel direction 25 of the vehicle. This represents the so-called normal seating position of a passenger. As can be seen in FIG. 3a, based on an angle of 90° between the slanted surfaces 20 for securing therebetween the ball 21, the angles $\alpha_1$ and $\beta_1$ to the horizontal are symmetrical to one another and measure 45°. This defines whereby a threshold value in the two horizontal acceleration directions of 1.0 g. This threshold value of 1.0 g is above the threshold value standard of 0.45 g defined by the European countries for a vehicle-sensitive sensor.

In the embodiment represented in FIG. 3b the back rest is pivoted by 200 in the direction of travel 25 and is thus brought into its vertical position. This means that also the slanted surfaces 20 of the second vehicle-sensitive sensor are pivoted about 20° in the direction of travel (arrow 25) since the second vehicle-sensitive sensor 18 is fixedly mounted within the safety belt reeling device. Thus, an angle $\alpha_2$ of 25° results and a threshold value for the second vehicle-sensitive sensor 18 of 0.47 g is defined. This threshold value, resulting from the change of the back rest position, is still greater than the threshold value of the first vehicle-sensitive sensor 13 of 0.45 g. Correspondingly, the threshold value related to the angle $\beta_2$ is also changed, but in the opposite direction of horizontal acceleration, to a value of 2.2 g. Even this high threshold value still provides a safety aspect upon failure of the other components of the vehicle-sensitive control system since for corresponding acceleration forces the activation of the locking system of the safety belt reeling device is still achieved.

FIG. 3c shows a position of the safety belt reeling device, respectively, of its fixedly connected second vehicle-sensitive sensor 18 in a position pivoted by 20° to the rear counter to the direction of travel (arrow 25). Correspondingly, the angle $\alpha_3$ is now 65° which corresponds to a threshold value of 2.2 g while the angle $\beta_3$, is 25° and determines a threshold value of 0.47 g. In this position the corresponding control conditions are still provided.

As a function of the respective size, respectively, mounting position it is also possible to provide other angular values for determining the threshold value of the second vehicle-sensitive sensor 18, especially for staying within the legally defined threshold values of the first vehicle-sensitive sensor in other countries, for example, of 0.7 g for the United States of America.

The present invention is, of course, in no way restricted to the specific disclosure of the specification and drawings, but also encompasses any modifications within the scope of the appended claims.

What I claim is:

1. A vehicle safety belt reeling device with a belt-sensitive control system for locking a reeling shaft of the safety belt reeling device when safety belt removal occurs at a rate above a preset limit, said safety belt reeling device comprising:

a reeling shaft;

a safety belt fastened with one end to said reeling shaft;

said reeling shaft rotatable for winding and unwinding said safety belt;

a vehicle-sensitive control system for locking said reeling shaft when horizontally acting vehicle acceleration forces are too great;

said vehicle-sensitive control system comprising a control disk with outer toothing and a locking lever for cooperating with said outer toothing such that said reeling shaft is locked when said locking lever engages said outer toothing and said reeling shaft is released when said locking lever disengages said outer toothing;

said vehicle-sensitive control system further comprising a first sensor, said first sensor activating said locking lever for engaging said outer toothing when a first preset threshold value, defined by government standards, for said horizontally acting vehicle acceleration forces is surpassed;

said vehicle-sensitive control system further comprising a second mechanical sensor acting directly on said locking lever, said second mechanical sensor activating said locking lever for engaging said outer toothing when a second preset threshold value for said horizontally acting vehicle acceleration forces is surpassed, said second threshold value being greater than said first threshold value and representing a force magnitude equivalent to low impact accidents.

2. A vehicle safety belt reeling device according to claim 1, mounted on an incline-adjustable vehicle seat such that, when the vehicle seat is incline-adjusted, an incline of the vehicle safety belt reeling device is changed, said vehicle safety belt reeling device further comprising a device for automatically vertically aligning an axis of said first sensor when the vehicle seat is incline-adjusted, wherein said second threshold value changes upon changing of the incline of the vehicle safety belt reeling device and wherein in any position of said vehicle safety belt reeling device said second threshold value is greater than said first threshold value.

3. A vehicle safety belt reeling device according to claim 1, wherein said vehicle-sensitive control system comprises a solenoid, wherein said solenoid is excited by said first sensor, when said first threshold value is surpassed, and moves said locking lever into engagement with said outer toothing.

4. A vehicle safety belt reeling device according to claim 1, wherein said second mechanical sensor is a ball sensor comprising a socket, a ball positioned in said socket, and an impulse lever activated by said ball and acting on said locking lever when activated, said socket comprised of slanted surfaces having an angle of incline relative to the vertical.

5. A vehicle safety belt reeling device according to claim 4, wherein said angle of incline of said slanted surfaces defines said second threshold value.

* * * * *